United States Patent [19]

Hill

[11] 4,205,964
[45] * Jun. 3, 1980

[54] PROCESS FOR PRODUCING CERAMIC POWDERS AND PRODUCTS RESULTING THEREFROM

[75] Inventor: Brian Hill, Ramsey, N.J.

[73] Assignee: The International Nickel Company, Inc., New York, N.Y.

[*] Notice: The portion of the term of this patent subsequent to Aug. 20, 1991, has been disclaimed.

[21] Appl. No.: 801,726

[22] Filed: Jan. 17, 1977

Related U.S. Application Data

[63] Continuation-in-part of Ser. No. 501,632, Aug. 24, 1974, abandoned, which is a continuation-in-part of Ser. No. 261,798, Jun. 12, 1972, abandoned.

[51] Int. Cl.² .............................................. B02C 19/12
[52] U.S. Cl. ......................................... 51/309; 106/43; 106/57; 106/65; 106/73.2; 106/73.4; 241/27; 423/252; 423/625
[58] Field of Search .......................... 423/625; 241/27; 51/309; 106/73.4, 65, 57, 43

[56] References Cited

U.S. PATENT DOCUMENTS

| 3,367,766 | 2/1968 | Barrington et al. | 241/5 X |
| 3,591,362 | 7/1971 | Benjamin | 241/27 X |
| 3,670,970 | 6/1972 | Szegvari | 241/27 |
| 3,738,828 | 6/1973 | Inoue | 75/0.5 |
| 3,801,688 | 4/1974 | McGee | 264/65 |
| 3,830,435 | 8/1974 | Hill | 241/27 |

OTHER PUBLICATIONS

Pryde, R. B. et al., "The Effect of Comminution on the Sinterability of Alumina & Tungsten Carbide Powders'-'-7th Pwansee Seminar, Jun. 1971, pp. 3-13.

Naeser, G., "Mechanical Activation of Solid Materials & its Technological Significance"-Int'N J. of Powder Metallurgy, 1970, 6 (2), pp. 3-11.

Gitzen, W. H. (ed.)-*Alumina as a Ceramic Material*, 1970, pub. Am. Cer. Soc.-Chapter 14, "Grinding Ceramic Alumina", pp. 117-119.

*Primary Examiner*—Helen M. McCarthy
*Attorney, Agent, or Firm*—E. C. MacQueen; R. J. Kenny

[57] ABSTRACT

A process and products produced thereby, e.g., alumina tools, in which ceramic powder particles are subjected to high transmissive energy milling under dry conditions and with given ratios of impacting media to powder, the milling being conducted for a period beyond the threshold point of the powder constituents, whereby dense, composite powder particles are obtained having an interdispersion of initial constituent particles, a large internal interfacial surface within individual product powder particles, etc.

13 Claims, 5 Drawing Figures

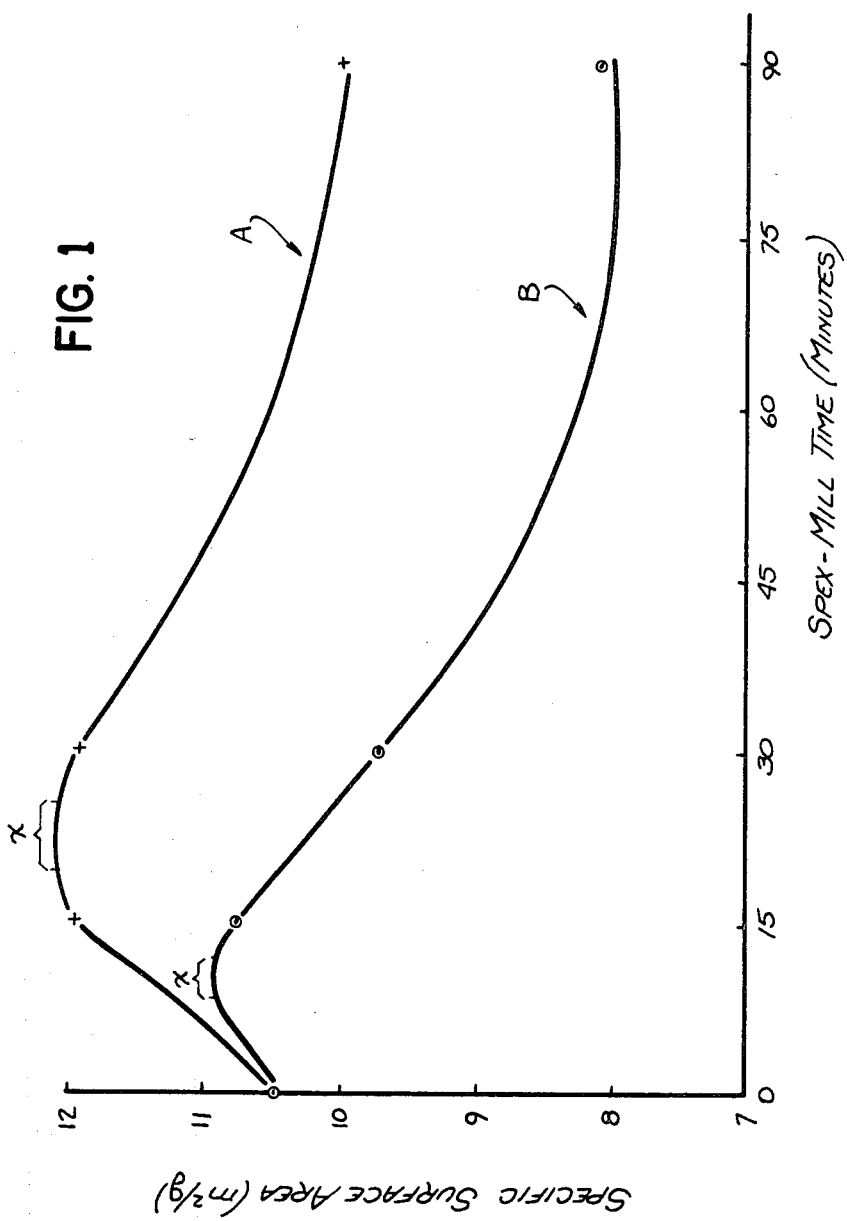

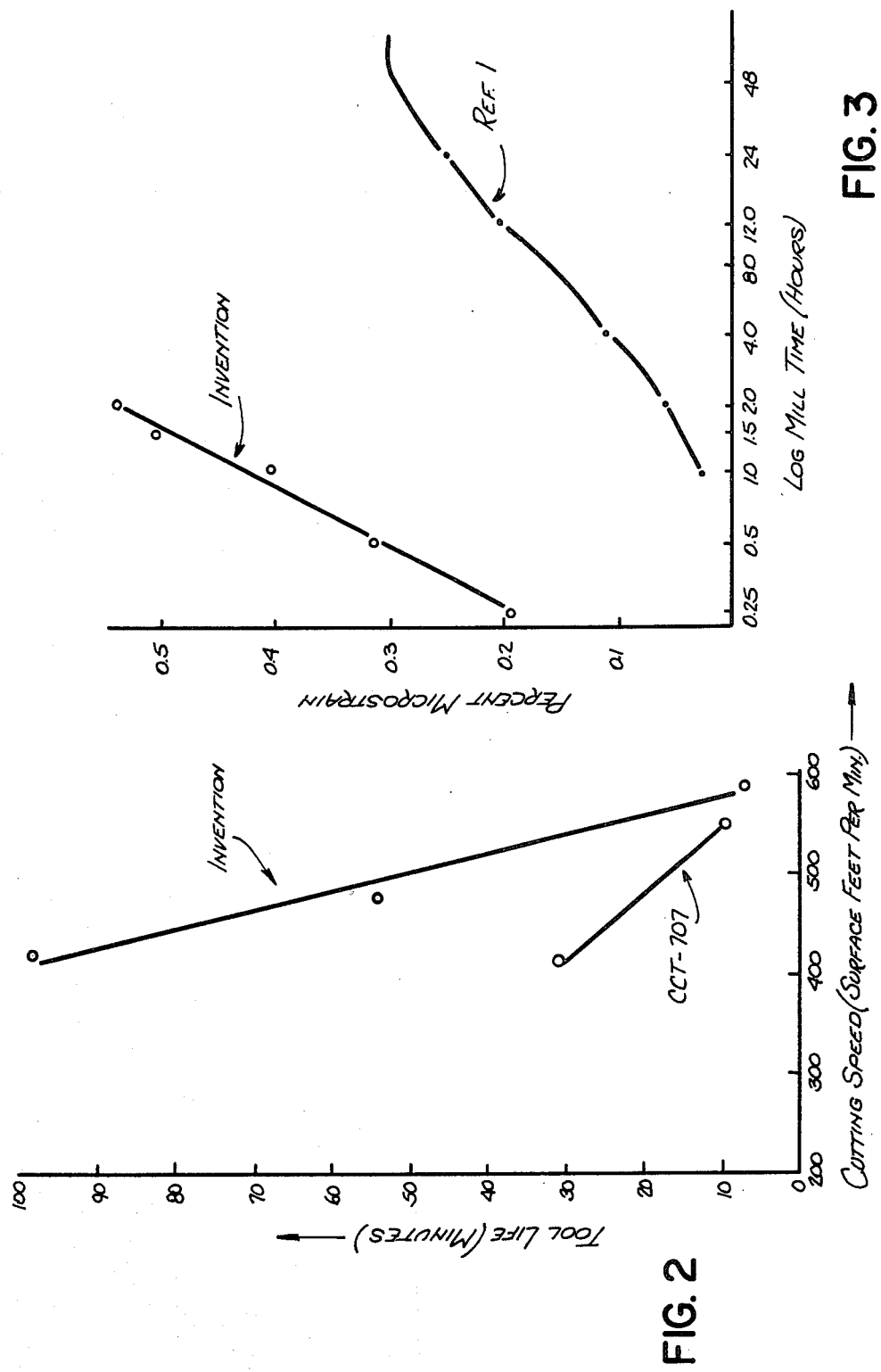

PROCESS FOR PRODUCING CERAMIC POWDERS AND PRODUCTS RESULTING THEREFROM

This application is a continuation-in-part of Ser. No. 501,632, filed Aug. 24, 1974, which in turn is a continuation-in-part of U.S. Ser. No. 261,798, filed June 12, 1972, both now abandoned.

The present invention is directed to ceramic materials and the like and to products produced therefrom.

It is known the term "ceramics" includes a most diverse group of inorganic materials having a variety of properties and end uses. Viewed from the standpoint of electrical properties, for example, ceramics range from semi-conductors to insulators of extremely high dielectric constant and strength, with those having a perovskite structure exhibiting piezo-electric properties. Ferrites, most of which possess a spinel structure, are outstandingly ferrimagnetic. And since most ceramics are of high melting point and chemically inert, they are particularly suitable in the handling of molten metals, glasses, slags, etc.

Ceramic articles employed in sophisticated applications such as cutting tools, ferrites and the like, have been produced from single materials, e.g., alumina, or from mixtures thereof by processes involving grinding to reduce agglomeration, pressing, either hot or cold, and ultimately final firing to sinter the object into the shape desired. A drawback common to virtually all ceramic powders is their inherent porous nature. This, in turn, contributes to low bulk and green compacting densities, giving rise to shrinkage and attendant problems, including the necessity of using exceedingly high (and costly) hot pressing temperatures. Green strength is also low. Too, it has been virtually impossible to cause intra homogeneity between two or more ceramics as any number of them are quite brittle and fragment upon impact. This has significantly precluded solid state interdispersion bonding of such particles as is contemplated herein.

Too, in terms of processing, say, component oxide powders, long periods are normally required. Usually starting powders are blended by ball milling in the presence of a slurry for an extended period, e.g., 24 hours. The slurry is then dried and heated to a high temperature to form the compound. This calcined or fired material must then be comminuted as by ball milling, again usually in the presence of a liquid and for a period of circa 24 hours. This is followed by drying and compacting into a solid mass using a binder, whereupon it is finally fired or sintered.

A few recent investigations (1) Pryde et al, "The Effect of Comminution of the Sinterability and Tungsten Carbide Powders". 7th Plansee Seminar, June 1971, pp. 1–8 and FIGS. 1–10, Department of Metallurgy and Materials Technology, University of Surrey; and (2) Naeser, "Mechanical Activation of Solid Materials and its Technological Significance", International Journal of Powder Metallurgy, 6(2), 1970, pp. 1–11, have given emphasis to the grinding operation to improve ceramic powder sinterability through improved densification. Thus, by long term (e.g., up to 48 hours) ball milling of alumina in a vibratory mill, a more dense sintered alumina was obtained (1), accompanied by powder fragmentation, reduced crystallite size, increased surface area, etc. Despite the long milling period (lengthy in comparison with the present invention but not uncommon for conventional practice) the alumina so characterized still would be unsatisfactory in accordance herewith.

Thus, it has remained highly desirable to provide ceramic materials (including mixtures) characterized by (a) higher bulk and compacted densities, (b) less shrinkage and thus enhanced dimensional accuracy in respect of the fired articles, (c) improved green strength, and (d) capability of being fired at lower temperatures, thereby reducing cost and contributing to achieving sintered articles of finer grain size and higher strength. Moreover, shorter processing periods would be decidedly attractive.

In addition, it might be added that it terms of ceramic tools, higher impact strengths are a desideratum. As will be seen herein, transverse rupture strengths of 100,000 psi and above can be obtained.

Generally speaking the present invention involves dry, high transmissive energy milling of powdered ceramic materials to produce dense, composite, product powder particles, the product particles being characterized by an intimate intradispersion of initial constituent particles, a large internal interfacial surface within individual product powder particles, and a surface area less than that of the original individual particles when the particle size of the initial powder constituent is small, say, less than 2–3 microns. A single ceramic material or a mixture of two or more thereof can be subjected to dry, high transmissive energy milling, whereupon composite particles are produced having individual constituents distributed substantially uniformly at close interparticle spacings within the product powder particles. Ceramic powder composites of two or more constituents are less brittle than the brittle components from which they are formed and are, unexpectedly, quite homogeneous, being intimately interdispersed through mechanical cold bonding in the solid state. Depending upon particle size of the initial materials and milling time, interparticle spacings in the product powder will usually be substantially less than 10 microns, e.g., 5 microns or 1 micron or even much less, e.g., 0.1 micron.

The high transmissive energy dry milled ceramic powders of the invention are characterized by improved bulk or pack density (e.g., when poured into a container and packed by tapping container), by enhanced pressability to provide better green strength and by superior hot pressing characteristics in comparison with identical materials prepared by ordinary ball milling, the latter utilizing liquid media for particle fragmentation or a surfactant under dry conditions for a similar purpose, grinding being accomplished largely through gravitational action. For example, dry, high transmissive energy milled micron or submicron sized pure alumina bodies are readily hot pressed within 15 minutes to virtually 100% density at 1500° C., whereas conventionally ball milled alumina seldom reaches 100% density even when sintered at substantially higher temperatures, e.g., 1650° C. Furthermore, pressed and sintered or hot pressed alumina compacts are fine grained and are uniform in grain structure, with the deviation from the mean grain size seldom exceeding about 10%. Additionally, less shrinkage occurs during firing, thereby contributing dimensional accuracy to the finished part. Hot pressed bodies produced according to the invention are devoid of porosity, including closed porosity. Other advantages will become apparent herein.

BRIEF DESCRIPTION OF THE DRAWINGS

FIG. 1 is a graph showing the relationship between milling time and surface area of alumina powder for two different ball to powder ratios;

FIG. 2 is a graph interrelating tool life and cutting speed for a cutting tool of the prior art and a cutting tool of the present invention;

FIG. 3 is a semi-log graph interrelating percent microstrain and milling time for both a prior art process and the process of the present invention.

Figure 4:
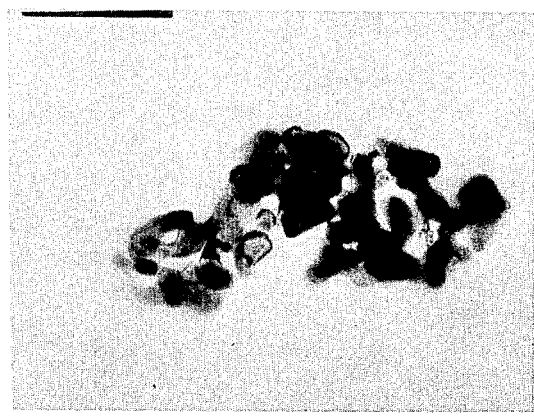
FIGS. 4(a) and 4(b) are electron photomicrographs of two samples of alpha alumina viewed at 42,000X.
Figure 4:
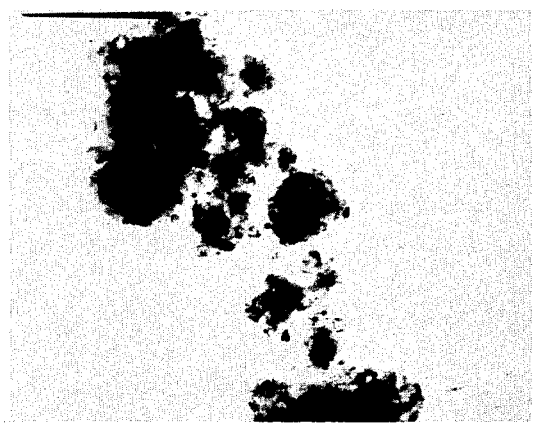

In high energy milling as contemplated herein and in respect of dealing with initial ceramic powder constituents of small particle size, less than 2–3 microns, product particle size is markedly increased as opposed to being comminuted and surface area is reduced rather than enlarged. This is thought to be in contrast to conventional ball milling and is also contrary to such milling techniques as described in (1). Energy transmission to the particles milled must be sufficiently intense to cause mechanical cold bonding of particles with the particles being most intimately interdispersed, a concept which, insofar as I am aware, is completely unknown in respect of the treatment of ceramic materials normally regarded as being inert, e.g., alumina, and highly fragmentable due to inherent brittleness. This mechanical cold bonding is depicted in a general sense in FIG. 1, the curves representing alumina (average particle size of 0.3 micron), dry, high transmissive energy milled (using a Spex mill) at two different ball-to-powder ratios, 5:1 (Curve A) and 20:1 (Curve B). It will be observed that for approximately 15 minutes (Curve A) and for about 7–8 minutes (Curve B), respectively, the alumina was undergoing comminution; thereafter, however, the particles mechanically bonded, surface area decreasing.

In milling initial powder ceramic materials of particles greater than about 2–3 microns, product particle size becomes smaller and surface area greater in accordance with the high transmissive energy conditions of the subject invention. This is illustrated herein.

Another concomitant of dry, high transmissive energy milling as contemplated herein, particularly when the initial charge comprises micron (less than 20 microns) or sub-micron particles, is X-Ray line broadening. In the case of pure alpha alumina having a particle size of about 0.3 micron, five peaks identifiable by X-Ray continue to display broadening as dry intensive milling, e.g., in a high energy Spex mill with a ball-to-powder ratio of 20:1, is carried out for period of up to three hours and more. In contrast, dry milling of the same material in an ordinary ball mill does not result in any notable X-Ray line broadening after 24 hours.

High transmissive energy dry milling may be accomplished in high-energy machines such as the Szegvari attritor, the high-speed laboratory shaker mill (Spex mill) or even in vibratory ball mills, but the ratio of ball-to-powder should be at least about 3:1, preferably at least 5:1 and most advantageously at least 10:1 or 15:1. (As is known, presently available Spex mills are generally small, and thus, are useful largely for laboratory work as opposed to commercial production.) During the course of the process, comminution of both initial constituents and mechanically cold-bonded interdispersed constituents also takes place, with a major site of the bonding and comminution actions apparently being the surface of the grinding media, e.g., balls, which may be steel, tungsten carbide, nickel, alumina, etc.

In carrying forth the invention, it is important that the surface lattice structure of the ceramics powders be broken down, altered or otherwise disrupted by the dry, high transmissive energy bombardment. By so doing, a considerable number of surface defects are formed, it being deemed that such defects are necessary to enable interfacial bonding to occur, and particle growth of small initial powders to ultimately take place; otherwise, mere agglomeration will primarily take place (agglomeration has largely occasioned the use of liquid media and surfactants heretofore). The onset of the mechanical cold bonding phenomenon can be referred to as the "threshold point" and is depicted at region "X" in the curves of FIG. 1. It represents the approximate point in time during which the slope of the comminution vs. bonding curve is changing from a comminution zone (powders are primarily comminuted or fragmented) through a neutral zone (tangent to the curve being about zero at which point neighter comminution nor bonding significantly exceeds the other) and then into a bonding zone value (particle growth and reduced surface area predominates). Milling should be continued well beyond the "threshold point".

The overall milling period, as will be understood by those skilled in the art, cannot be precisely defined for it will obviously depend on the particular ceramic powders being milled, the amount of energy transmitted from the bombarding media to the powder, including ball-to-powder ratio, etc. For commercial purposes, a milling period of at least 1 or 2 hours should be used. The upper end of the milling period need not exceed 10–15 hours.

It is important that the milling be conducted dry and the use of solid or liquid separating agents, lubricants, detergents, etc., be avoided in the mill as otherwise the interdispersion bonding and the increase in internal interfacial surface which characterize the intensively dry milled powders is undesirably interfered with or is prevented. However, in milling coarse powders, say, 10 microns, particularly 20 microns, and above, there is a tendency for powder to excessively pack against walls and corners of the energy device, e.g., a Szegvari attritor. If this be troublesome, a small amount of an agent such as oxalic acid or stearic acid may be used. In any case, the increase in internal interfacial surface can be measured by a combination of decrease in crystallite size measured by X-Ray line broadening, increase of particle size measured by electron microscopy and decrease in specific surface area as measured by B.E.T. apparatus.

As intensive dry milling proceeds the internal homogeneity of the product powder improves up to an optimum milling time which, as will be appreciated by the artisan, is deemed to be mostly a function of the powder system being milled. Continued milling does not appear to further improve homogeneity of the product powder. Homogeneity can be followed by the electron beam microprobe, the scanning electron microscope, and similar techniques. In some cases, intensive dry milling provides homogeneity in the product on a scale approaching the molecular, a point exceeding the capability of presently available measuring devices.

In conducting dry, high transmissive energy milling in accordance with the invention, it is usually necessary to employ a charge comprising grinding media together with the powdered material to be milled. The entire charge is then subjected to accelerative forces such that a substantial portion of the grinding elements, e.g., ball elements, are continuously and kinetically maintained in a state of relative motion. In striving for best results, it is advantageous to maintain a major portion, e.g., 75% or more, of the attractive elements out of static self contact, the kinetic accelerative forces causing a substantial number of elements repeatedly to collide with each other. It is difficult to achieve such a state of kinetic activation of a high proportion of attritive elements, e.g., balls, in the ordinary ball mill in which usually a substantial proportion of the ball elements, i.e., those in the lower portion of the ball charge, remain in static bulk contact. Usually, only the balls in the active cascading zone of an ordinary ball mill can be said to be kinetically active.

Advantageously, at least about 60%, e.g., 80%, of the grinding media present in the charge should be maintained in a highly activated state. It is usually necessary that mechanical energy be applied to the ball elements multidirectionally, such as through the application of vibratory or oscillatory motion to the balls. As an example, the high speed shaker mill (Spex mill) oscillates at rates of up to 1200 cycles or more per minute, subjecting attritive elements present in the mill to velocities of up to about 300 centimeters per second. In such a mill the ratio of ball elements by weight to the weight of the powder being milled may be relatively low, e.g., about 3:1 or more. At lower levels of applied mechanical force than can be realized in the high speed shaker mill, it is usually necessary that the weight ratio of grinding elements, e.g., balls, to the powder being milled should be higher, e.g., 10:1 or more.

With regard to the particle size range of powdered materials treatable in accordance with the invention, they may vary over the range from about 0.01 to about 150 microns, preferably not exceeding about 0.05 to about 10 microns. Coarse initial powders, e.g., about 40 microns average particle size, tend to prolong the milling time since the particles must be comminuted in the mill before an homogeneous dispersion with large interfacial can be obtained. As mentioned, packing might be a problem.

To give those skilled in the art a better appreciation of the invention, the following examples are given:

EXAMPLE I

A charge of 15 grams of high purity alumina having a particle size of about 0.05 micron was milled in the Spex mill under dry conditions for 90 minutes using steel balls at a ball-to-powder ratio of 3:1. A portion of the thus milled powder was hot pressed at 2,450 lbs. per square inch (psi) at 1500° C. for 15 minutes in a square graphite die to yield a cutting tool blank. The tool blank was of 100% density, had a grain size of about 2 microns, a uniform grain diameter which did not depart from the mean value by more than 10%, and a hardness of 92.5 Rockwell "A". The blank was gound to ¾"×¾"×3/16" using diamond wheels with the finishing wheel having 320 mesh diamonds of 100 concentration. A 1/16" nose radius was then ground on each corner and finished using a light hand honing.

Tools prepared as thus described were then compared for tool life against a commercial ceramic tool CCT-707 of the same dimensions. The test material was SAE 4340 steel bars initially 5.9" in diameter by 18" long, quenched and tempered to a hardness of 50 to 52 Rockwell "C". No cutting fluid was used in the tests. The tool inserts were mounted in a tool holder and approached the test material at −5° back and side rake, 15° side cutting edge angle, 15° end cutting edge angle and 5° relief. A 0.050" depth to cut was used with a 0.005" feed per revolution. Tool wear was measured with a traveling microscope having a measuring capability of 0.0001". Tool life end point was taken as 0.015" uniform flank wear or 0.030" localized wear, whichever occurred first.

Tests were conducted at 3 cutting speeds in each case to plot a representative tool life curve for each tool. In many tests the length of the cut exceeded the length of the test bar with the results that each succeeding cut was conducted on a reduced bar diameter. In such cases the cutting speed was averaged over the length of the cut. The data obtained demonstrated that for a tool life of 30 minutes, tools made in accordance with the invention had a cutting speed of 540 surface feet per minute, whereas the commercial tool demonstrated a cutting speed of only 400 surface feet per minute. Under the test conditions employed, the cutting speed determined on the commercial tool very closely reproduced data on the commercial tool obtained at a standard testing laboratoy in cutting the same type of steel.

FIG. 2 offers a comparison of tool life vs. cutting speed of the above-described alumina as against the CCT-707 ceramic tool. Using a cutting speed of 400 sfpm, the alumina tool within the invention offers a tool life over about 300% as long.

EXAMPLE II

In order to demonstrate the effect of dry, high transmissive energy milling upon the crystallite structure of alumina, a charge of high-purity alpha alumina powder (Linde "A") having an average particle size of 0.3 micron was milled dry in a Spex mill (air atmosphere) for periods of time up to 3 hours. Initial bulk density was 0.43 gm/cc and initial specific surface area was 10.8 m$^2$/gm. Powder samples were withdrawn from the mill at intervals and examined by X-Ray using the Integral Breadth technique. The results are set forth in the following Table I.

TABLE I

| X-Ray Analysis of Milled Al$_2$O$_3$ at 20:1 Ball:Powder Ratio | | |
|---|---|---|
| Specimen | Crystallite Size (A°)* | Strain (%)* |
| As received | 582 | 0.02 |
| 15 mins. Spex-milled | 202 | 0.2 |
| 30 mins. Spex-milled | 167 | 0.3 |
| 60 mins. Spex-milled | 128 | 0.4 |
| 90 mins. Spex-milled | 152 | 0.5 |
| 120 mins. Spex-milled | 125 | 0.54 |

*from 5 X-Ray peaks

Upon high energy milling, average product powder particle size was 1.3 microns, bulk density 1.8 gm/cc and specific surface area 9 m$^2$/gm.

It will be observed that the crystallite size was reduced to well below 200 Angstroms in 30 minutes or less and that a microstrain of over 0.5% was attained in less than 2 hours. I am not aware of any form of alumina, this was greyish-black in color, having such physical properties. Reference (1) obtained a crystallite size of between 400 and 500 Angstroms and a microstrain of but about 0.3% after milling 48 hours. This is also depicted in FIG. 3. The present invention contemplates alumina powder characterized by a crystallite size of less than 250 Angstroms, e.g., 200 Angstroms or less and advantageously not more than about 175 or 150 Angstroms, particularly in combination with a microstrain of 0.3% or higher, for example, 0.35% or 0.4% to 0.5% and greater.

FIGS. 4(a) and 4(b) depict a striking contrast between alpha alumina "before" and "after", i.e., as received from a commercial source 4(a) and after being dry, high energy milled 4(b) for 3 hours in accordance herewith at a ball-to-powder ratio of about 20:1. The magnification was at 42,000X and represents the finest fraction available such that one could see through the powder using transmission microscopy to determine the defects.

The following data (Examples III–V) are intended to reflect what can be expected using two or more different ceramic starting constituents in the production of ceramic tools.

EXAMPLE III

Using the laboratory "Spex" mill, 1.25 grams of lime stabilized zirconia powder having a particle size of about 2.5 microns and 3.75 grams of high purity alumina having a particle size of about 0.3 micron were milled under dry conditions for 90 minutes using steel balls at a ball-to-powder ratio of 20:1. A portion of the thus milled powder was hot pressed at 5300 lbs. per square inch at 1500° C. for 15 minutes in a square graphite die to yield a cutting tool blank. The tool blank was of 100% density and had a hardness of 91.7 Rockwell "A". The blank was ground to ¾"×¾"×3/16" using diamond wheels, with the finishing wheel having 320 mesh diamonds of 100 concentration. A 1/16" nose radius was then ground on each corner and finished using a light hand honing.

Tools prepared as thus described were then compared for tool life against a commercial ceramic tool CCT-707 of the same dimensions. The test material was SAE 4340 steel bars initially 5.9" in diameter by 18' long, quenched and tempered to a hardness of 50 to 52 Rockwell "C". No cutting fluid was used in the tests. The tool inserts was mounted in a tool holder and approached the test material at −5° back and side rake, 15° side cutting edge angle, 15° end cutting edge angle and 5° relief. A 0.050" depth of cut was used with a 0.005" feed per revolution. Tool wear was measured with a traveling microscope having a measuring capability of 0.0001". Tool life end point was taken as 0.015" uniform flank wear or 0.030" localized wear, whichever occurred first.

Tests were conducted at various cutting speeds in each case to plot a representative tool life curve for each tool. In many tests the length of cut exceeded the length of the test bar, with the results that each succeeding cut was conducted on a reduced bar diameter. In such cases the cutting speed was averaged over the length of the cut. The data obtained demonstrated that for a tool life of 30 minutes, tools make in accordance with the invention had a cutting speed of 500 surface feed per minute, whereas the commercial tool demonstrated a cutting speed of only 400 surface feet per minute. Under the test conditions employed, the cutting speed determined on the commercial tool very closely reproduced data on the commercial tool obtained at a standard testing laboratory in cutting the same type of steel.

EXAMPLE IV

A further portion of the Example II powder was hot pressed at 5300 pounds per square inch at 1500° C. for 15 minutes in a rectangular graphite die to yield a transverse rupture blank. The rupture blank was of 100% density and was ground to ¼"×⅛"×1½" using diamond wheels, with the finishing wheel having 320 mesh diamond of 100 concentration. The ground specimens were placed in a three-point loading test rig in an Instron testing machine, using a ¾" span between the outermost supports. The rig was loaded at a crosshead speed of 0.02" per minute and the load required to break the specimen noted.

The strength of the specimen was calculated from the breaking load, its dimensions and the span. The calculated "Transverse Rupture Strength" was 110,600 pounds per square inch, being a mean of three determinations. This value is 30% higher than the literature value for the CCT-707 ceramic tool, which is reported as 85,000 pounds per square inch.

What is of importance is that a "Transverse Rupture Strength" in excess of 100,000 psi was achieved. This should afford enhanced toughness.

EXAMPLE V

A charge consisting of 2.5 grams of tungsten carbide having a particle size of about 4 microns and 2.5 grams of high purity alumina having a particle size of about 0.3 micron was milled as in Example II. A portion of the thus milled powder was hot pressed in a square graphite die to yield a cutting tool blank as detailed in Example I. The tool blank was 100% density and had a hardness of 93.1 Rockwell "A". The blank was gound to a cutting tool as detailed in Example I.

Tools prepared as described were compared for tool life against a commercial ceramic tool CCT-707 of the same dimensions. The testing procedures were the same as is detailed in Example II except that the testing was done with and without water soluble emulsifying oil as a cutting fluid.

Tests were conducted at various cutting speeds in each case to plot a representative tool life curve for each tool, as explained in Example II. The data obtained demonstrated that for cutting speeds of 450–650 surface feed per minute, the tool life remained constant within one minute at 16.5 to 17.5 minutes. The tool life increased sharply below 450 surface feet per minute to a tool life of 30 minutes at 390 surface feet per minute.

A further portion of the above described powder was hot pressed and machined to transverse rupture specimens exactly as described in Example III. The strength of four specimens was averaged at 100,550 pounds per square inch.

EXAMPLE VI

Two (2) kg of Meller commercial grade alumina powder having an average particle size of 0.3 micron as determined by Fisher Sub Sieve Analysis, an initial specific surface area of about 31 $m^2$/gm, a bulk density of 0.25 gm/cc, an initial crystallite size of 582 A° and a microstrain of 0.02%, was high energy milled in a 10 horsepower, 4-S Szegvari attritor having a 1½41 diameter vertical shaft with six pairs of horizontal arms (staggered spirally) of ¾" diameter and extending 5-1/16 inches from the shaft. Approximately 8100 steel balls were used as the impacting elements at a ball-to-powder ratio of 18:1 (by weight) and ratio of diameter of impacting balls to average particle diameter of approximately 26,458:1. The shaft speed was 283 rpm and milling was conducted for 6 hours. For the fixed charge of balls the energy level was calculated to be roughly $3.7 \times 10^7$ ergs per sec. per gm of powder.

The resulting alumina product powder particles were quite satisfactory as evident from microstructural analysis and the following characteristics were noted: particle size, 1.23 micron; specific surface area, 24 m$^2$/gm; bulk density, 0.73 gm/cc; crystallite size 125 A°; and a microstrain of 0.5%.

EXAMPLE VII

Using the 10 horsepower, 4-S Szegvari attritor of Example VI at 283 rpm and approximately 8100 5/16" steel balls, 2 kg of Reynolds RC-172 alumina powder was high energy milled for eight hours at a ball-to-powder ratio of 18:1 (by weight). In this case, however, coarser alumina particles were employed, the initial particle size average being 11.4–12.4 micron using a Fisher Sub Sieve Analyser. Because of the relative coarse powder, a small quantity, 1% of the powder weight, of oxalic acid was used to minimize packing. The initial specific area was 5 m$^2$/gm; bulk density was 0.99 g/cc; crystallite size was approximately 1275 A°; and microstrain was about 0.06%.

Microstructural analysis revealed the powder to have processed quite satisfactorily with the following characteristic noted: average particle size, 0.9 micron (Fisher Sub Sieve); specific surface area, 11 m$^2$/gm; bulk density, 0.75 gm/cc; crystallite size, about 210 A°; and microstrain, 0.465%.

EXAMPLE VIII

Example VI was repeated but using a small amount of oxalic acid to determine its affect. Final particle size was 1.12 micron (initially 0.3) and specific surface area was 25 m$^2$/gm (initially 31 m$^2$/gm). There was little effect.

EXAMPLE IX 5 gms of the Reynolds RC-172 coarse alumina powder (11.4–12.4 micron) of Example VII was high energy milled in the Spex mill for 90 minutes using 100 gms of 5/16" steel balls (45 balls), the ball-to-powder ratio being 20:1. Oxalic acid or equivalent agent was not used. Final particle size was 1.75 micron and the specific surface area was 23 m$^2$/gm (vs. 5 m$^2$/gm). This experience was quite similar to Example VII, and 4-S Szegvari attritor mill, i.e., particle size decreasing and surface area increasing with the coarser powder.

In addition to the foregoing, other advantages of the instant invention include a greatly reduced milling period in comparison with conventional ball milling and this is a decided economic advantage, apart from delivering a superior product. This is achievable in periods of but one-half to three hours in an energy machine such as the Spex mill or a roughly equivalent high energy apparatus versus the twenty-four to upwards of forty-eight hours or more common to standard processing. This marked difference also obtains against some of the more recent investigations (1) as can be seen from FIG. 3 in which, considering microstrain only, a level of 0.3% strain was attained by (1) in 48 hours (not improving thereafter) vs. the approximately ½ (or less) to one hour required by the present invention.

Moreover, the occurrence of intragranular porosity is greatly inhibited. This is attributable to the fine grain structure of the hot pressed or pressed and sintered product. If the grains are growing, intragranular porosity is a likely consequence and, as is known, this is virtually impossible to eliminate. In addition, it should be pointed out that the structure of the treated powders is block-like rather than plate-like, the aspect ratio of the produced powders being less than about 10:1. This is beneficial in achieving good packing characteristics and uniform mechanical properties in all directions, i.e., the composite particles are devoid of detrimental anisotropic effects.

The ability to provide powders having fine-scale homogeneity in accordance with the invention extends to a wide variety of solid metal compounds, e.g., metal oxides, and mixtures of such compounds. The proportions of constituents within the mixture can be varied from a few hundredths of a percent to about 100% at the expense of others, and still the product powders are homogeneous. This fact indicates that the invention may be utilized in the production of articles such as a lithia-doped nickel oxide semiconductor.

The invention is applicable to a wide variety of ceramic and ceramic combinations including compounds such as the oxides of aluminum, titanium, magnesium, beryllium, silicon, calcium, lanthanum, cerium, yttrium, iron, nickel, cobalt, copper, manganese, tantalum, columbium, thorium, zirconium, hafnium, antimony, zinc, chromium, the carbides of silicon, boron, zirconium, hafnium, tantalum, vanadium, molybdenum, tungsten, niobium, titanium, the borides of the high melting metals of the fourth, fifth, sixth periodic groups, high melting point nitrides such as those of beryllium, boron, aluminum, silicon, the lanthanides and actinides, scandium, titanium, vanadium, yttrium, zirconium, niobium, hafnium and tantalum, and even sulfides such as those of cerium, thorium, etc.

As will be apparent to the artisan, the invention is to be distinguished from producing "powder agglomerates" which are essentially clusters or masses of loose (sometimes packed) powder, and also from welding in which one constituent is simply joined to another, there being a distinct absence of solid state intimate and homogeneous interdispersion bonding.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for producing dense, composite ceramic product powder particles, the product particles being characterized by (i) an intimate interdispersion of initial constituent particles, (ii) a large internal interfacial surface within individual product powder particles with the individual constituent particles being distributed substantially uniformly at close interparticle spacings within the product powder particles, and (iii) a high degree of homogeneity where at least two different ceramic starting powders are used, which comprises forming a charge composed of milling impacting elements and the ceramic powder particles to be milled, the weight ratio of impacting elements to powder being greater than 3:1, subjecting the charge under dry conditions to high transmissive energy milling such that the individual constituent powder particles are continuously brought into contact with the compressive energies of the milling impacting elements, and continuing the milling for a period beyond the threshold point of the powder constituents such that the constituent powder particles undergo substantial mechanical cold bonding in the solid state and such that the surface area of the composite product powder particles is less than that of the constituent powders with the particle size being markedly increased, whereby dense, composite, mechanically cold-bonded ceramic product powder particles are produced, the composite product particles being further characterized by improved bulk density, and enhanced pressability characteristics in comparison with ordinary ball milling of the initial constituent powders.

2. The process in accordance with claim 1 in which the interparticle spacing is less than about 10 microns.

3. The process in accordance with claim 1 in which the weight ratio of impacting elements to ceramic powder is at least 10:1.

4. The process in accordance with claim 3 in which at least two different ceramic constituents are milled.

5. A process for producing dense, alumina composite product powder particles, the product particles being characterized by (i) an intimate interdispersion of initial constituent particles, (ii) and a large internal interfacial surface within individual product power particles with the individual constituent particles being distributed substantially uniformly at close interparticle spacings within the product powder particles, which comprises forming a charge composed of milling impacting elements and alumina powder particles to be milled, with the weight ratio of impacting elements to powder being greater than 3:1, subjecting the charge under dry conditions to high transmissive energy milling such that the individual alumina powder particles are continuously brought into contact with the compressive energies of the milling impacting elements, and continuing the milling for a period beyond the threshold point such that the constituent alumina powder particles undergo substantial mechanical cold bonding in the solid state and such that the surface area of the alumina composite product powder particles is less than the constituent powders with the particle size being markedly increased, whereby dense, composite, mechanically cold-bonded alumina product powder particles are produced, the composite product particles being further characterized by improved bulk density, enhanced pressability and hot pressing characteristics in comparison with ordinary ball milling of the initial alumina powders.

6. The process in accordance with claim 5 in which the alumina is further processed to form a ceramic cutting tool.

7. The process in claim 5 in which zirconia is also present as a starting constituent as well as alumina.

8. A cutting tool formed from the composite product powder particles of claim 7.

9. The process in claim 5 in which tungsten carbide is also present as a starting constituent as well as alumina.

10. As an article of manufacture, alumina having a crystallite size of less than about 250 Angstroms and a microstrain of at least 0.3%.

11. The alumina described in claim 10 and having a crystallite size of less than 200 Angstroms.

12. The alumina described in claim 10 and having a crystallite size of not greater than about 150 Angstroms and a microstrain of at least 0.35%.

13. The alumina described in claim 12 and having a microstrain of at least about 0.4%.

* * * * *

UNITED STATES PATENT AND TRADEMARK OFFICE
CERTIFICATE OF CORRECTION

PATENT NO. : 4,205,964

DATED : June 3, 1980

INVENTOR(S) : Brian Hill

It is certified that error appears in the above-identified patent and that said Letters Patent is hereby corrected as shown below:

Column 7, line 40 : "18'" should read -- 18" --

Column 7, line 62 : "feed" should read -- feet --

Column 8, line 46 : "feed" should read -- feet --

Column 8, line 63 : "1½41" should read -- 1½" --

Column 11, line 27 : "power" should read -- powder --

Signed and Sealed this

Thirteenth Day of March 1984

[SEAL]

Attest:

GERALD J. MOSSINGHOFF

Attesting Officer

Commissioner of Patents and Trademarks